United States Patent [19]

McLaughlin

[11] Patent Number: 5,282,438
[45] Date of Patent: Feb. 1, 1994

[54] AQUARIUM

[75] Inventor: Thomas McLaughlin, Chappaqua, N.Y.

[73] Assignee: Technical Support Services Inc., Ossining, N.Y.

[21] Appl. No.: 940,978

[22] Filed: Sep. 4, 1992

[51] Int. Cl.$^5$ .............................................. A01K 63/00
[52] U.S. Cl. ..................................... 119/248; 119/51.04
[58] Field of Search ................................ 119/5, 51.04

[56] References Cited

U.S. PATENT DOCUMENTS

| | | |
|---|---|---|
| 192,595 | 7/1877 | Palen et al. . |
| 1,634,305 | 7/1927 | Schrimp . |
| 1,943,417 | 1/1934 | Bringman ............................ 119/5 |
| 2,512,678 | 6/1950 | Rice ................................... 119/5 |
| 2,646,021 | 7/1953 | Rice ................................... 119/5 |
| 3,584,602 | 6/1971 | Stasio ................................. 119/5 |
| 3,795,225 | 3/1974 | Ogui .................................. 119/5 |
| 3,900,004 | 8/1975 | Goldman et al. ................. 119/5 X |
| 3,903,844 | 9/1975 | Greenia .............................. 119/5 |
| 3,921,583 | 11/1975 | DeShores ........................... 119/5 |
| 3,921,584 | 11/1975 | Scantlin ............................. 119/5 |
| 3,991,715 | 11/1976 | Gibson, Jr. ......................... 119/5 |
| 4,082,062 | 4/1978 | Rodemeyer ........................ 119/5 |
| 4,364,132 | 12/1982 | Robinson ............................ 4/546 |
| 4,516,529 | 5/1985 | Lotito et al. ....................... 119/5 |
| 5,005,521 | 4/1991 | Strong ............................... 119/5 |

Primary Examiner—Robert P. Swiatek
Attorney, Agent, or Firm—Darby & Darby

[57] ABSTRACT

An aquarium comprises a bifurcated pedestal and a cylindrical transparent viewing tank mounted within the arms of the pedestal. The pedestal contains a reservoir beneath the viewing tank, the volume of the reservoir being sufficient to hold the contents of the viewing tank. A secondary fish tank or drawer is mounted within the pedestal beneath the reservoir. The fish drawer contains gravel and aquarium plants, and fish can move freely between the viewing tank and fish drawer. The fish drawer is removable from the pedestal to replace the fish and/or aquarium plants during which time water from the viewing tank is stored in the reservoir. Water filters are provided within the pedestal with water conduits arranged so that when the viewing tank is filled with water, water flows under the influence of gravity from the fish drawer up to the filter and then back to the reservoir. Pumps within the reservoir pump the water into the viewing tank. Lamps are mounted within the arms of the pedestal to illuminate the contents of the viewing tank and additional lamps are provided to illuminate the fish drawer for viewing purposes and also to provide light for the aquarium plants. An automatic fish feeding device is also mounted within the pedestal. An air pocket is formed beneath the fish feeding device so that the fish food can fall onto a surface.

30 Claims, 6 Drawing Sheets

AQUARIUM

This invention relates to fish aquariums. More particularly, the invention relates to an aquarium construction which enables the manufacture of aquariums of unusual designs.

Fish aquariums are commonly used in homes, restaurants and other types of commercial establishments. Frequently, an aquarium is a focal point in a room, particularly if it contains unusual or attractive fish. In the vast majority of cases, an aquarium comprises a transparent tank, typically rectangular in cross-section, supported on a stand or other mounting surface. The design of the aquarium itself (as opposed to its contents) is usually not an important part of the overall display.

The present invention relates to an aquarium of unusual design which is intended to be a significant decorative feature of an aquarium display, whether for residential or commercial purposes. In the preferred embodiment, a viewing tank in the form of a transparent cylinder is supported in a bifurcated pedestal. The invention provides a construction in which fish may be maintained in a healthy environment in such a viewing tank. It is a feature of the preferred embodiment of the invention that fish can be maintained in a decorative and uniquely designed aquarium for long periods of time with very little maintenance.

The object of the invention is to provide an aquarium construction of particular utility with tanks of unusual design, wherein maintenance requirements are low yet the environmental conditions for the fish in the tank are comparable to the environmental conditions provided by conventional aquariums.

SUMMARY OF THE INVENTION

In accordance with the invention, an aquarium comprises a pedestal and a transparent viewing tank mounted on the pedestal. The pedestal contains a reservoir sufficient in size to store the contents of the viewing tank, and a removable fish tank or fish drawer. The fish drawer can be inserted into the pedestal in fluid communication with the viewing tank so that fish can move freely between the viewing tank and fish drawer. Pumps are provided within the pedestal for pumping water from the reservoir into the viewing tank.

In the preferred embodiment, the pedestal also contains filters through which the water is continuously recirculated under the influence of gravity due to the water within the viewing tank.

The pedestal may also contain lamps for illuminating the contents of the viewing tank and the fish drawer, if desired. In the preferred embodiment, the pedestal also contains an air pump for oxygenating the water and an automatic feeding device for supplying food to the fish for extended periods of time such as one month or even longer.

DETAILED DESCRIPTION

In accordance with the invention, an aquarium comprises a pyramid-shaped pedestal 10 and a cylindrical transparent viewing tank 12 supported within the pedestal 10 as described below. A secondary fish tank 14 is also supported within pedestal 10 and contains gravel and aquarium plants but can be removed if desired to replace the fish or other contents of the aquarium. Because the secondary tank 14 slides in and out of pedestal 10, it is referred to herein as a fish drawer. As described in detail below, the fish drawer 14 may be clamped into a fluid tight connection with the viewing tank 12 so that the viewing tank and fish drawer become a single aquarium with the fish able to swim freely between the two units.

The aquarium also contains a reservoir 16 within pedestal 10 (see FIG. 2), filters 18 and 20, and water pumps 22 and 23 for recirculating the water through the filters. Any suitable filtering arrangement may be employed. For example, if activated carbon and filter floss are used as the filtering elements, a two stage filtering arrangement may be used with the carbon in one filter and the filter floss in the other. If preferred, both filtering materials can be placed in each of the filters. Although the filters 18 and 20 are illustrated as loose material, in practice the filter materials will be contained in nylon bags or the like, as is customary, to facilitate replacement.

In the preferred embodiment, a feeding box 24 is also mounted within pedestal 10. As described below, apparatus is provided for periodically dispensing the contents of the feeding box 24 onto the surface of the water within the fish drawer 14 to provide for continuous feeding of the fish within the aquarium over an extended period of time, for example, approximately one month or more.

Air pumps 26 and 28 are mounted beneath the feeding box 24 within pedestal 10. Pump 26 is used to oxygenate the water within the aquarium. The second air pump 28 provides air to keep the food within feeding box 24 dry and to maintain a pocket of air in the top of the fish drawer as described below.

The upper portion of pedestal 10 is bifurcated to form arms 10A and 10B between which the viewing tank 12 is mounted. A pair of mirrors 33, shaped as trapezoids and congruent with the exposed surfaces of the bifurcated arms 10A and 10B (FIG. 3), are arranged within pedestal 10 on opposite sides of viewing tank 12. The mirrors 33A and 33B serve an aesthetic purpose in that they hide the pedestal arms from a viewer by reflection. When the viewing tank 12 is filled with the water, the pressure of the water causes the walls of the tank to bow outwardly. The pedestal arms 10A and 10B thus serve an important functional purpose in that they prevent excessive bowing of the cylindrical walls when the tank is filled. The fit between the pedestal arms and viewing tank should not be so tight, however, that the viewing tank cannot easily be removed when it is empty.

In each of the pedestal arms 10A and 10B, two pairs of fluorescent lights 30 are mounted so that the contents of the viewing tank 12 are illuminated by light passing through white acrylic diffusers 32 mounted in the mirrors 33A and 33B. The electrical system for activating the lights 30 may be standard and, therefore, is not illustrated in the drawings or described in the specification.

Water Recirculation

Figure 10:
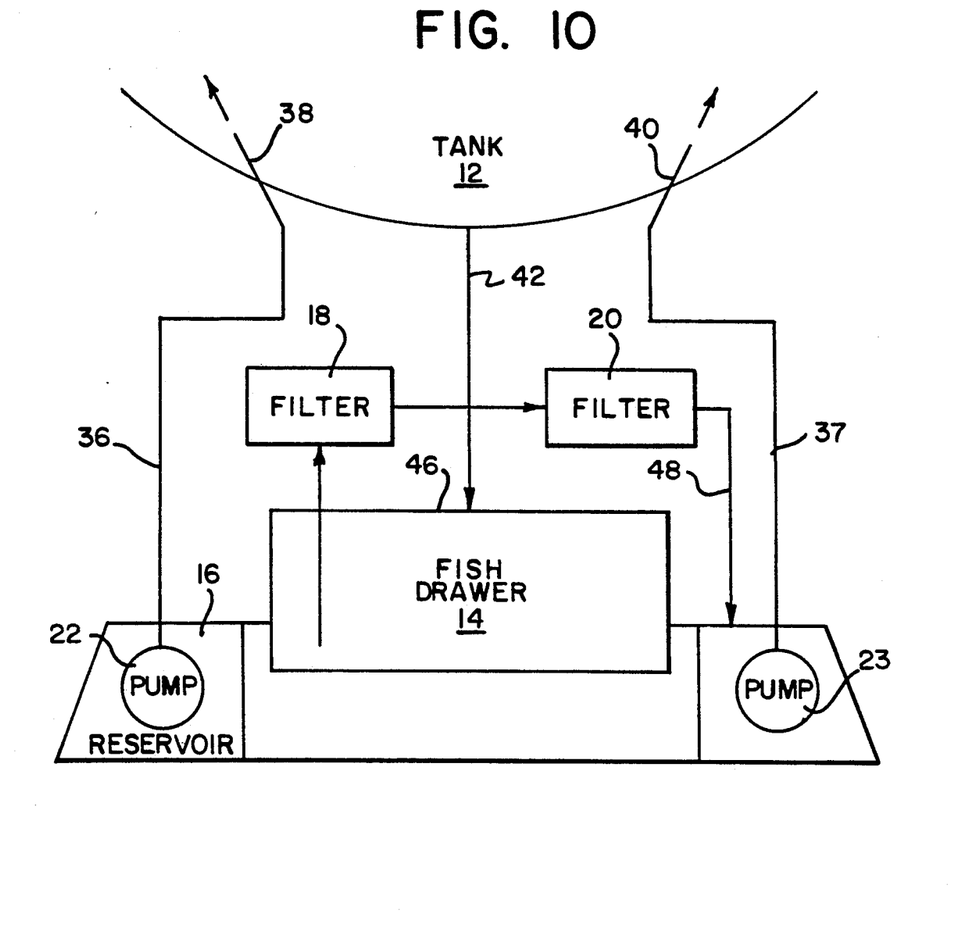
FIG. 10 is a schematic illustration for purposes of explanation showing the way in which water is recirculated through the various parts of the aquarium in accordance with the preferred embodiment of the invention.

Before describing in detail the construction of the aquarium, it is helpful to have an understanding of the way in which water is recirculated from reservoir 16 through the viewing tank 10 and fish drawer 14. FIG. 10 is a schematic illustration of the aquarium showing the elements described so far and illustrating the way in which water is recirculated in the aquarium.

Figure 7:
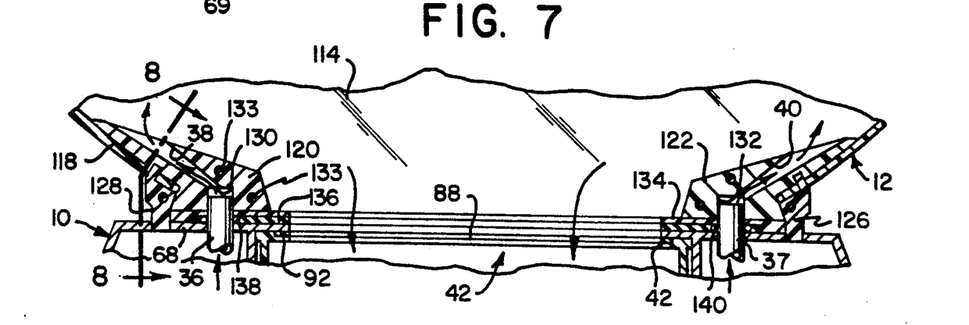
FIG. 7 is a front sectional view along the line 7—7 of FIG. 5 showing certain structural details of the viewing tank and the manner in which the viewing tank and fish drawer are connected.

Pumps 22 and 23 are mounted directly in reservoir 16 (see FIGS. 3 and 4) and pump water from the reservoir through outlet tubes 36 and 37, respectively, into inlet nozzles 38 and 40 of viewing tank 12 (FIG. 7). The inlet nozzles 38 and 40 are peripherally directed in opposite directions so that water is directed against the outer surface of viewing tank 12. When both pumps 22 and 23 are turned on, the flow of water through the oppositely directed nozzles 38 and 40 tends to reduce turbulence within the tank. Where desired, a single pump 22 or 23 may be used, in which case the water tends to flow in an orbital manner creating a mild current in the viewing tank which in some cases is stimulating to the fish.

Figure 5:
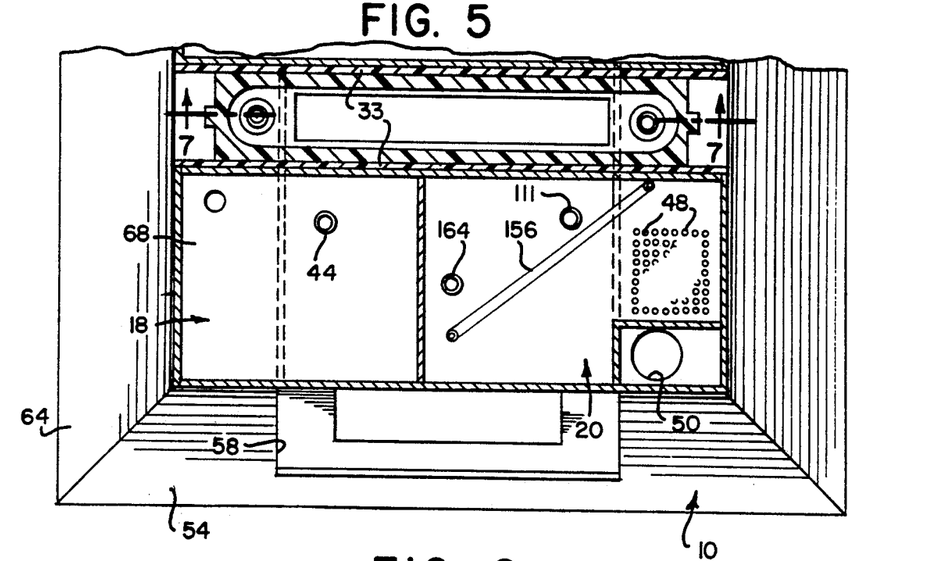
FIG. 5 is a top sectional view along the line 5—5 of FIG. 3.

In use, viewing tank 12 and fish drawer 14 are locked together with an opening between them through which the fish can swim. This opening is represented in FIG. 10 by line 42 and is shown as the opening 42 in FIG. 3. Water flows under the influence of gravity from the viewing tank 12 to the fish drawer 14 through opening 42. It is recirculated from the fish drawer 14 through an up flow pipe 44 (see FIG. 2) into the filter 18. The recirculated water from fish drawer 14 is taken from the bottom of the fish drawer and passes from filter 18 to filter 20 through an opening 46 between the filters (see FIG. 2). The water then flows downwardly from filter 20 back into reservoir 16 through down flow perforations 48 (see FIG. 5) in a shelf 68 between the filter and reservoir on which the filter is supported.

A filler hole 50 (FIG. 5) enables water to be added to the reservoir as needed.

The Pedestal

Figure 1:
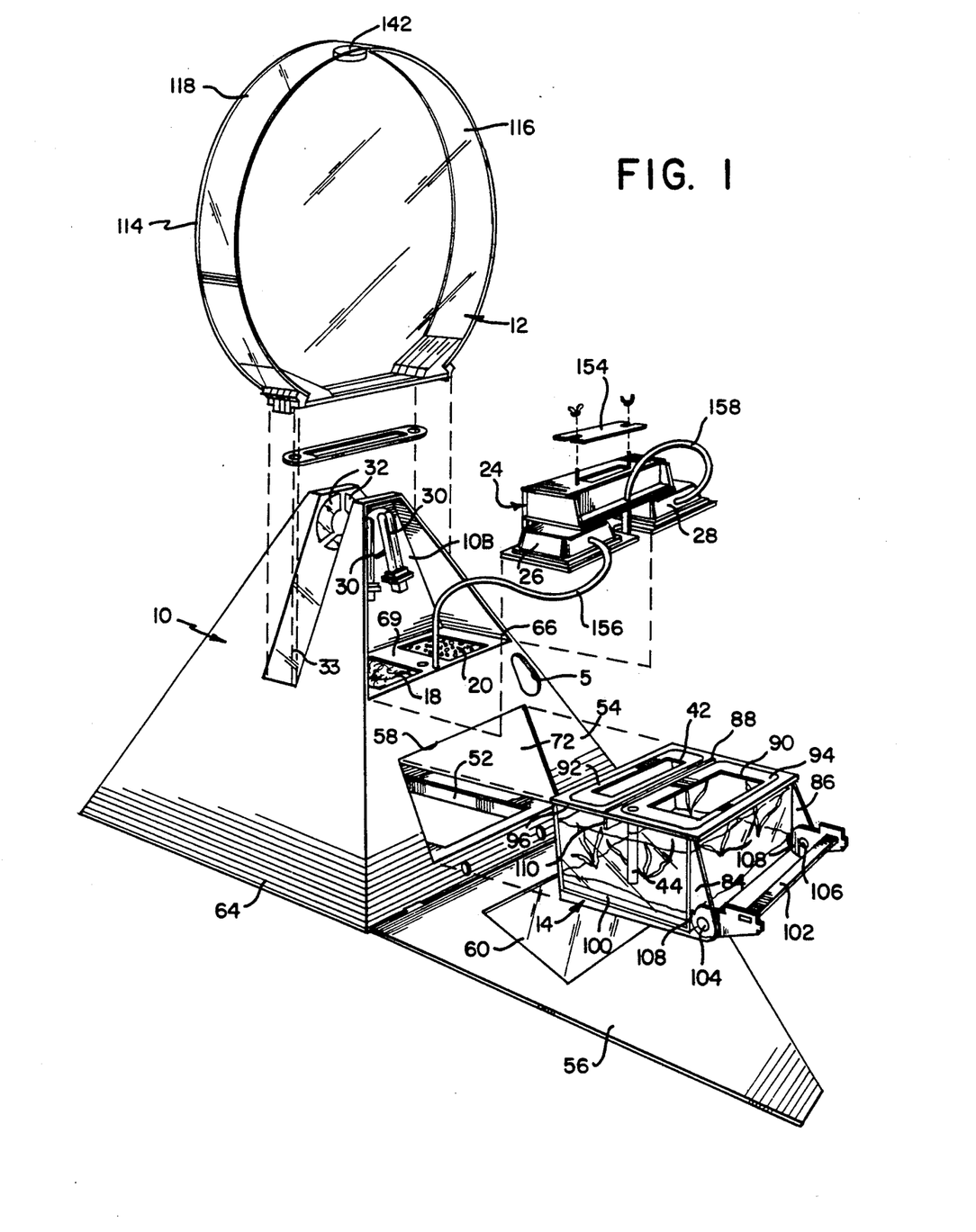
FIG. 1 is an exploded perspective view showing the design of an aquarium in accordance with a preferred embodiment of the invention.

Pedestal 10 preferably is made of a lightweight material such as aluminum and includes a base 52 and a front plate 54 which is covered by a decorative panel 56. Decorative panel 56 is hinged at its bottom surface to the front plate 54 to provide access to the interior portion of the pedestal. The fish drawer 14 is received through the opening 58 as shown in FIG. 1. Decorative panel 56 may include a transparent window 60 so that the contents of the fish drawer 14 can also be viewed. The pedestal also includes a rear plate 62 (FIG. 3) and side plates 64 and 66 (FIG. 2) of sufficient strength to support the weight of the aquarium. The various plates of the pedestal may be connected by welding. The entire pedestal may be covered by appropriate decorative panels (not shown) for aesthetic purposes.

Figure 3:
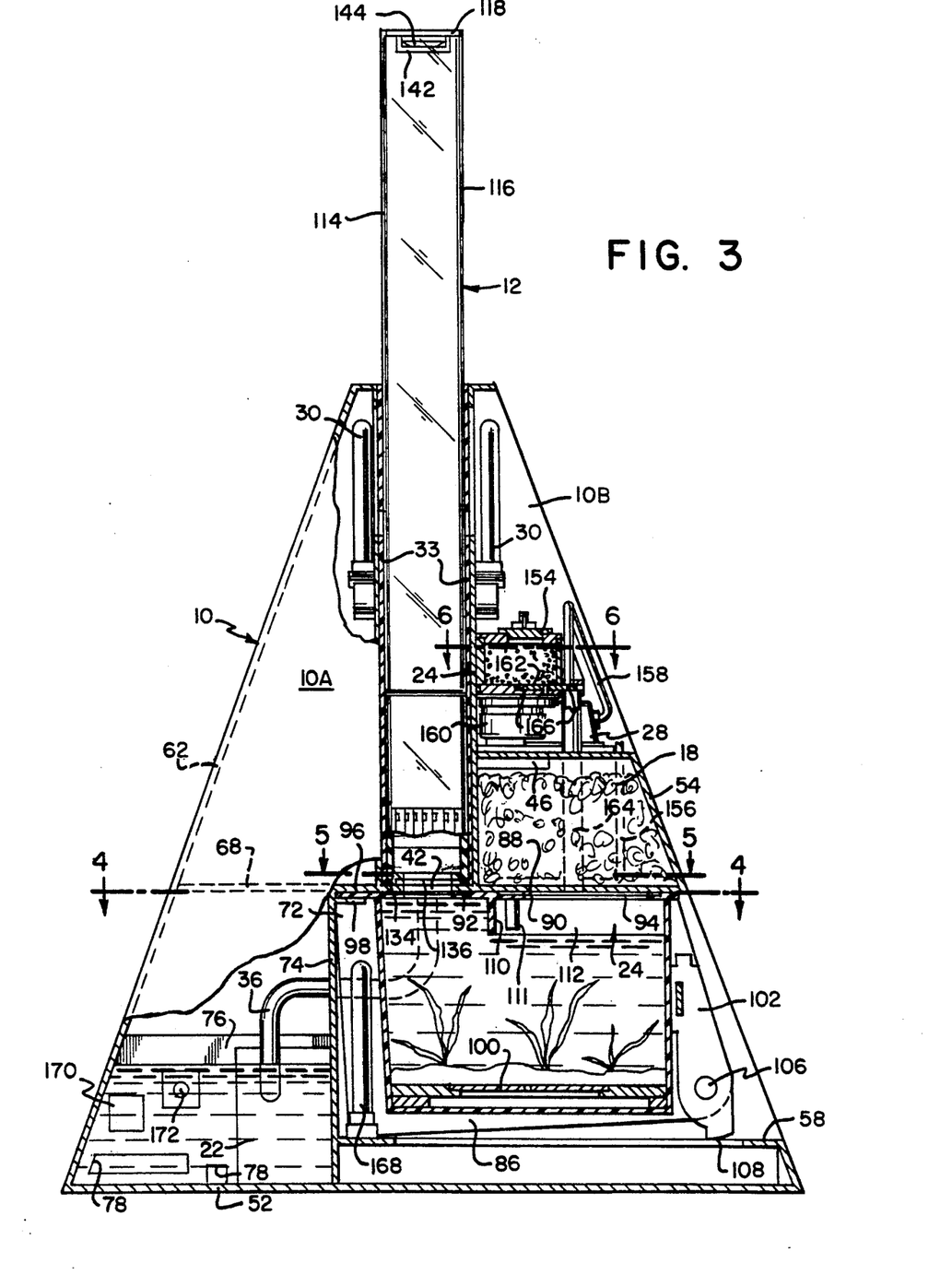
FIG. 3 is a side sectional view along the line 3—3 of FIG. 2.
Figure 4:
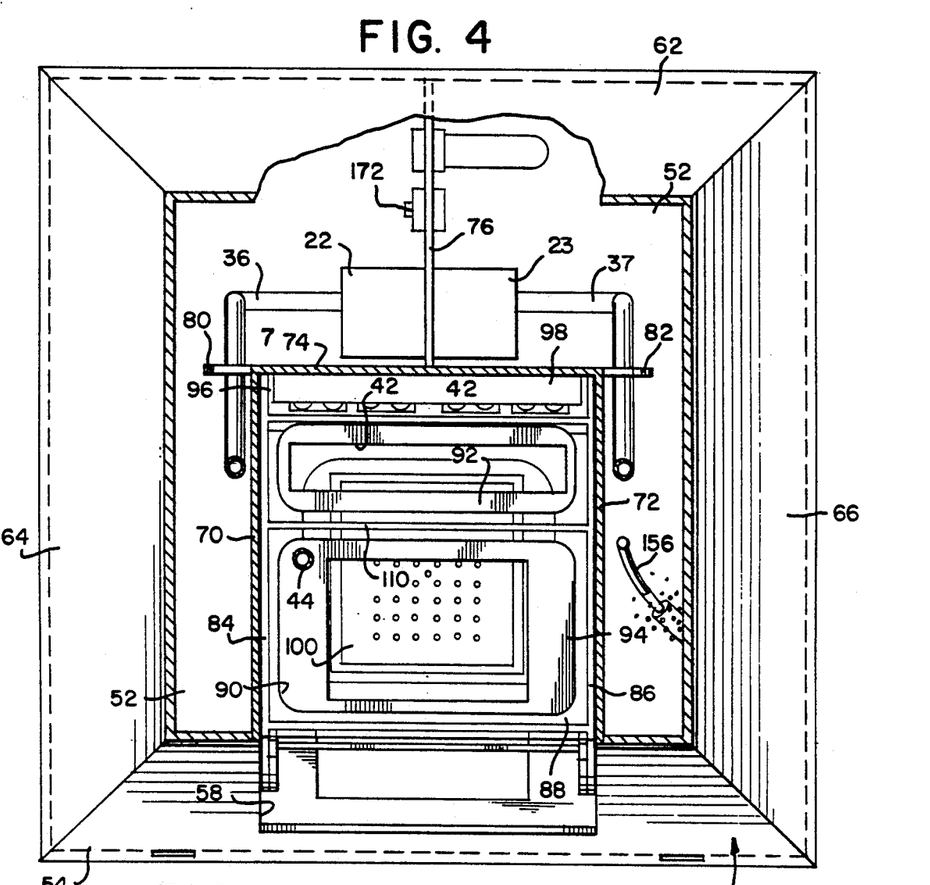
FIG. 4 is a top sectional view along the line 4—4 of FIG. 3.

Lower and upper shelves 68 and 69 (FIGS. 2 and 3) are supported within pedestal 10. Lower shelf 68 is supported on the top of two interior side walls 70 and 72 (FIG. 4) and an interior back wall 74. The interior walls 70 and 72 are sealed to the front plate 54 thereby forming reservoir 16 between the outer plates of the pedestal and the interior walls 70, 72 and 74. A vertical mounting plate 76 is connected between the back wall 74 and rear plate 62. Openings 78 (FIG. 3) in the mounting plate 76 enable free flow of the water within the reservoir. As shown in FIG. 4, pumps 22 and 23 are mounted on opposite surfaces of the mounting plate 76. Two ears 80 and 82 extend laterally from opposite ends of the interior back wall 74 (FIGS. 2 and 4) and include holes (not numbered) for supporting the outlet tubes 36 and 37 from pumps 22 and 23.

Filler hole 50 is formed in shelf 68 and separated from filter 20 by an L-shaped wall 83 between shelves 68 and 69. Access to the filler hole 50 is through an opening 85 in the front pedestal plate 54 (FIG. 1).

The Fish Drawer

Figure 2:
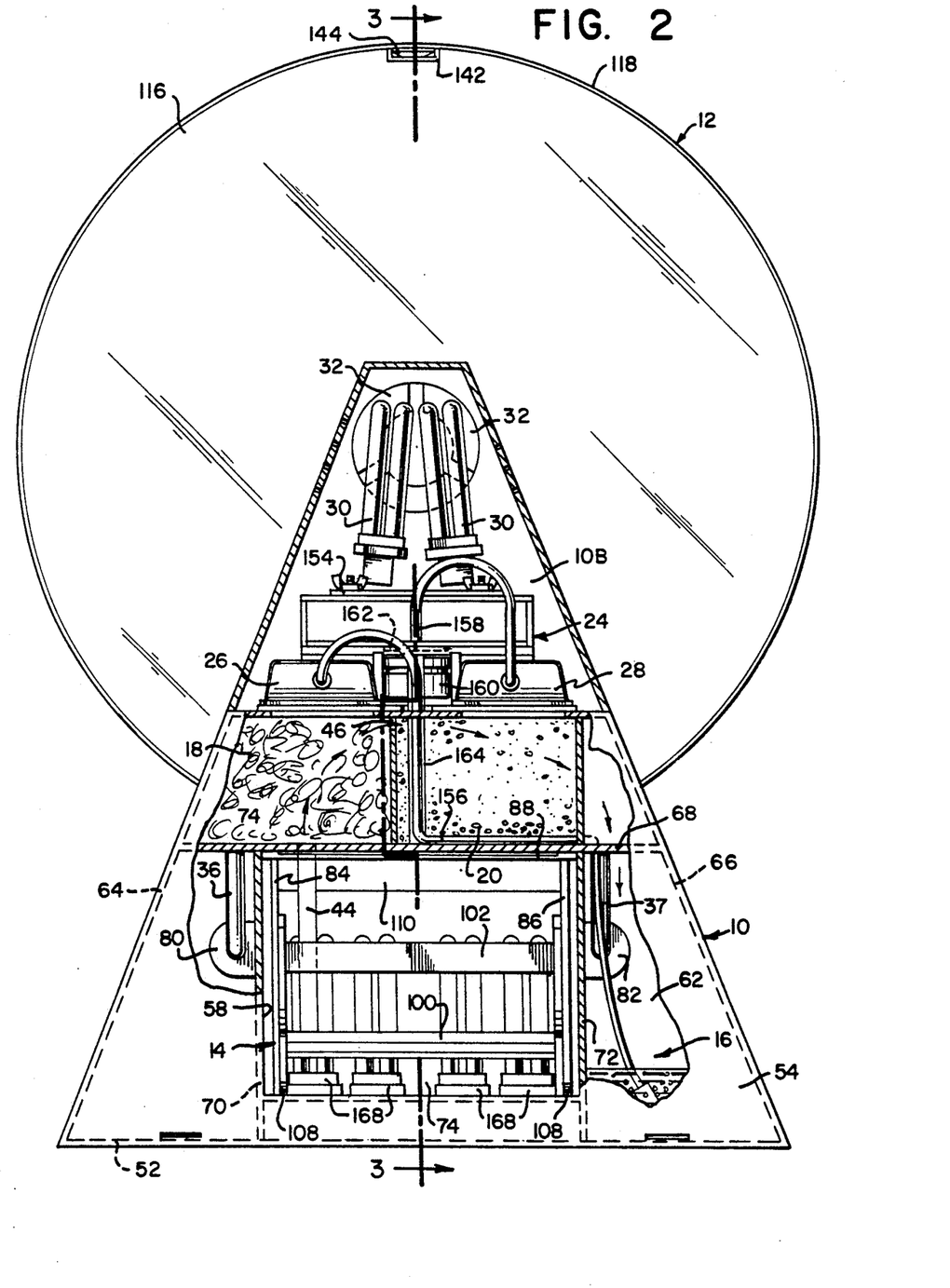
FIG. 2 is a front view of the preferred embodiment of the invention with part of the outer panel removed.

As shown in FIG. 2, fish drawer 14 is in the form of a transparent box made, for example, of acrylic plates and sealed to prevent leakage. In accordance with the preferred embodiment of the invention, the fish drawer is removable by sliding but, in use, is clamped into a tight sealed engagement with the viewing tank 12. The drawer 14 includes side panels 84 and 86 shaped as most clearly shown in FIG. 3, i.e., increasing slightly in height from front to back. The drawer includes a cover 88 having a feeding opening 90 and the above described opening 42 which provides communication between viewing tank 12 and drawer 14. Gaskets 92 and 94 envelop the respective openings 42 and 90 for sealing purposes. A gasket (not shown) may also envelope the outlet opening of up-pipe 44. Cover 88 extends rearwardly of the fish drawer 14 to form a supporting lip 96 which is received in a slot between the bottom surface of pedestal shelf 68 and a horizontal strip 98 (FIG. 3).

An apertured grate 100 is suitably mounted just above the bottom of the fish drawer 14. Grate 100 can support sand or gravel in which aquarium plants can be planted. The upflow pipe 44 is mounted in the grate 100 so that it conducts water from beneath the grate to the first filter 18.

The fish drawer includes a handle 102 which is rotatably mounted on stub axles 104 and 106 suitably journalled within the side panels 84 and 86, respectively, of the fish drawer 14. Handle 102 rotates from a horizontal position (FIG. 1) to a vertical position as shown in FIG. 3. The handle 102 includes cam surfaces 108 (only one shown in FIG. 3) adapted to engage the pedestal base 52 as the handle is rotated from the horizontal to the vertical position. With the rear lip 96 of fish drawer 14 supported within the track between strip 98 and shelf 68, the handle 102 effectively cantilevers fish drawer 14 into a tight engagement with the viewing tank 12. Gasket 92 engages the bottom surface of pedestal shelf 68 to prevent leakage. During use, fish drawer 14 is thus supported on the front surfaces of the side panels 84 and 86 and the cam surfaces 108 of handle 102.

The fish drawer also includes a short baffle 110 (FIG. 3) extending across the width of fish drawer 14 between openings 42 and 90, and a short vent 111 which opens into the filter compartment and terminates just above the bottom baffle 110. The baffle and vent enable an air pocket 112 to be formed beneath feeding opening 90 when the aquarium is filled with the water, as explained below. The purpose of the air pocket is to provide a surface on which fish pellets can be dropped.

The Viewing Tank

The viewing tank is best illustrated in FIGS. 3, and 7-9. It primarily consists of two transparent circular outer walls 114 and 116 which are locked in place by an elongated peripheral strip 118 attached to two nozzle blocks 120 and 122 and a sealing plate 134 by pegs 126 and 128.

By way of example, the outer walls 114 and 116 may be made of one-fourth inch cast acrylic with the circumference machined to produce tabs 117A and 117B. Peripheral strip 118 made of eighth inch acrylic has two slots 119A and 119B machined its entire length along the inside outer edges. To assemble the tank, the peripheral strip 118 is heated with a strip heater and wrapped around the walls 114 and 116 with the slots 119A and 119B engaging tabs 117A and 117B encircling walls 114 and 116.

The free ends of peripheral strip 118 are received in notches within nozzle blocks 120 and 122, already attached to sealing plate 134, and locked in place by mounting pegs 126 and 128. Once cooled to room temperature the result is a mechanical assembly wherein the walls 114 and 116 are essentially locked into peripheral strip 118 and sealing plate 134. Water tightness is achieved by an application of adhesive or sealant, such as methylene chloride. As shown in FIG. 7, the lower extremities of the mounting pegs 126 and 128 are received in apertures (not numbered) within the pedestal platform 68 to ensure proper alignment of the viewing tank with respect to the mounting pedestal. The gap between blocks 120 and 122 forms an opening at the bottom of viewing tank 12 which defines the opening 42 between the viewing tank and fish drawer. It is desirable to have a large enough opening in the base of the viewing tank 12 to facilitate periodic cleaning of the viewing tank. In this respect, the opening should be large enough to permit the insertion of a cleaning utensil of sufficient size to reach all interior areas of the viewing tank.

Figure 8:
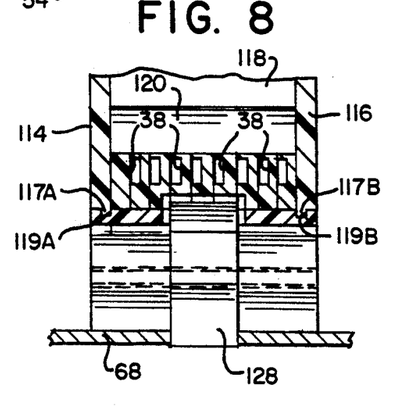
FIG. 8 is a sectional view along the line 8—8 of FIG. 7.

Nozzle blocks 120 and 122 include channels 130 and 132, respectively, to receive outlet tubes 36 and 37 from pumps 22 and 23. The nozzle blocks 120, 122 and pegs 126, 128 may be formed from a laminate of similarly shaped pieces with the nozzles 38 and 40 formed in alternate pieces so that the nozzles have the cross-section as shown in FIG. 8. The laminated pieces which form nozzle blocks 120, 122 and the mounting pegs 126, 128 may be held together by pins 133 and a suitable adhesive such as thickened methylene chloride.

The bottom of viewing tank 12 includes sealing plate 134 beneath which a rubber gasket 136 is mounted to provide a seal between the viewing tank 12 and the top of the pedestal platform 68 to form a watertight contiguous opening with fish drawer 14 when the fish drawer is clamped against the bottom of pedestal platform 68. The substantial weight of the water within the viewing tank 12 when it is filled will compress rubber gasket 136 sufficiently to prevent leakage from the viewing tank. O-rings 138 and 140 prevent leakage from nozzles 38 and 40 as water is pumped through the nozzles.

Figure 9:
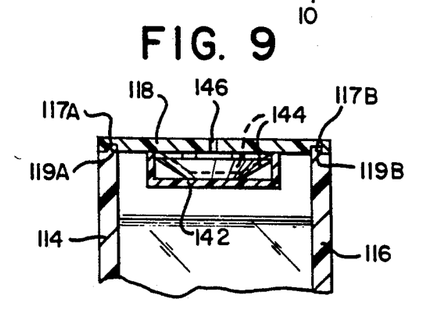
FIG. 9 is a sectional view showing the valve arrangement at the top of the viewing tank which enables the viewing tank to be entirely filled with water.

As shown in FIG. 9, a valve arrangement is positioned at the top of viewing tank 12 so that the viewing tank can be filled entirely with water. The valve comprises a cage 142 and a flexible cup 144 which rests within the cage 142. An air hole 146 is provided in the top of the viewing tank immediately above the flexible cup 144. As water enters the viewing tank through nozzles 38 and 40, the cup 144 remains in the position shown in FIG. 9. When the water finally reaches the cup 144, the cup 144 is pushed upwardly (as shown by the dashed lines) but if it is sufficiently flexible, the cup will allow the water to rise within the viewing tank until the viewing tank is essentially completed filled. At that point, the flexible cup 144 seals the air hole 146 preventing leakage.

Miscellaneous

The preferred embodiment of the invention includes means for feeding the fish within the aquarium over an extended period of time, an air pump for oxygenating the water and appropriate means for maintaining a proper temperature of the water. The temperature control means may be conventional and is not illustrated or described in the specification.

As mentioned above and as shown in FIGS. 1 and 2, the two air pumps 26 and 28 are mounted on the upper pedestal shelf 69 above filters 18 and 20. Openings 155 (FIG. 2) supply air for the pumps. The feeding box 24 containing pellets of dried fish food is supported within the pedestal above the pumps 26 and 28. Access to the feeding box 24 is provided by means of a door 154 which can be screwed tightly down onto the box to provide an air tight seal. This seal is necessary to enable the air pocket 112 to be formed in fish drawer 14.

A flexible tube 156 extends from the air pump 26 into the reservoir 16 to oxygenate the water within the reservoir. The air pump 26 is attached to an outlet tube 158 which functions to create an air pocket in the top of the feeding area 24 to keep the food dry and also to assist in the feeding operation. Feeder box 24 should be sealed so that the pellets within the box do not become damp. Likewise, the pedestal compartment within which air pumps 26, 28 and feeder box 24 are mounted should be sealed from the high moisture atmosphere above the reservoir 16. The air pump 28 serves the dual function of creating air pocket 112 and maintaining relatively dry air within the feeder tube 164 to keep the feed within the box 24 dry. It is contemplated that the air pressure may be applied directly to the feed box 24 to help dry the food.

The ability to create air pocket 112 is a valuable feature of the invention. Fish feed from the surface of the water in an aquarium and without the air pocket in the top of the fish drawer there would be no surface on which to drop the fish food. The air pocket is produced by air from pump 28 which pushes the water beneath the opening 90 (contained by baffle 110) down to the lower extremity of vent pipe 111. Since the feeding tube 164 opens into the air pocket 112, it is necessary that the entire feeding system be sealed so that the positive air pressure from pump 28 can create air pocket 112.

Figure 6:
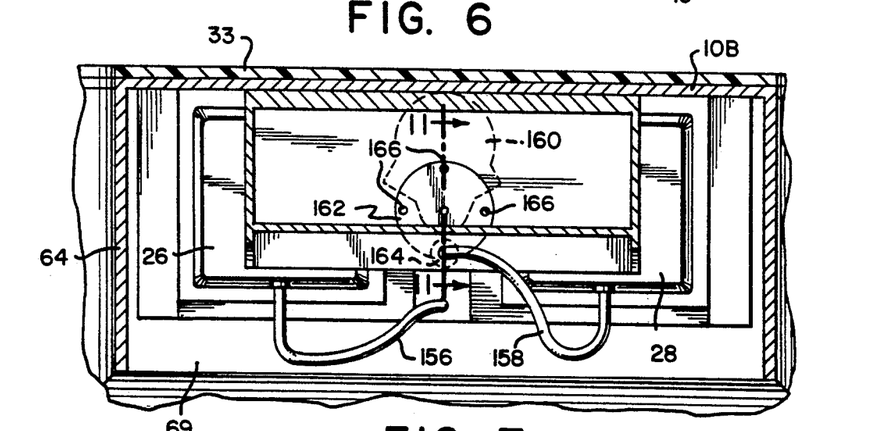
FIG. 6 is a top sectional view along the line 6—6 of FIG. 3 showing certain elements of the feeder box.
Figure 11:
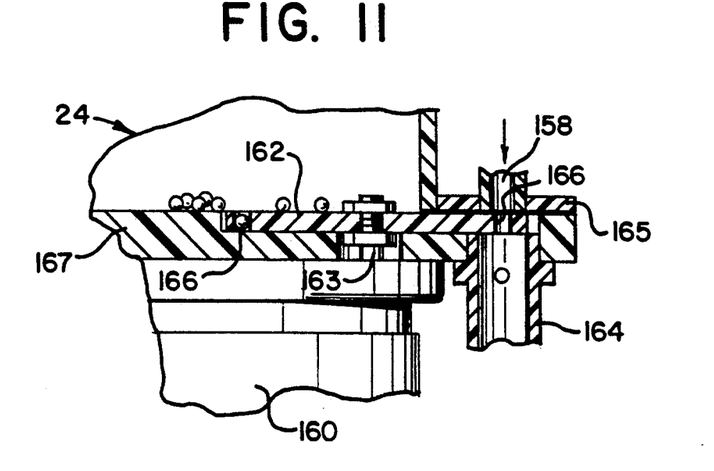
FIG. 11 is a sectional view along the line 11—11 of FIG. 6.

As shown in FIGS. 3, 6 and 11, the automatic feeding means includes a gear motor 160, a disk 162 which is rotated by the motor 160 through motor drive shaft 163, and a vertical feeder tube 164 which extends through pedestal shelves 69 and 68, opening into the air pocket 112 within the fish drawer 114. Disk 162 rotates within a circular aperture (not numbered) in the base 165 of feeder box 24 which rests on a horizontal plate 167. Disk 162 contains four apertures 166 which pick up a pellet of fish food as the disk 162 rotates in the base 165 of feeding box 24 (FIGS. 3 and 11). When the pellet is moved to a position immediately above the feeder tube 164, the pellet drops through tube 164 onto the surface of the water within fish drawer 14 beneath air pocket 112.

In the preferred embodiment, gear motor 160 may rotate at a nominal speed of four rpm. If disk 162 includes four holes, each of which is capable of moving a single pellet, the system then is capable of dropping sixteen pellets per minute onto the surface of the water within fish drawer 14. In the preferred embodiment, the gear motor is timer controlled to turn the motor on for preselected periods of time within a twenty-four hour period. This enables the user to vary the amount of food supplied to the aquarium which, of course, depends on the amount and type of fish within the aquarium at any given time.

To provide light for viewing purposes, fish feeding and for the plants within fish drawer 14, four fluorescent lamps 168 are mounted on the pedestal base 52 behind the rear panel of the drawer. A conventional temperature sensor 170 and water level sensor 172 may be mounted within the mounting plate 76.

To assemble the aquarium, the viewing tank 12 is inserted into pedestal 10. After these two parts are assembled, gravel, plants, water and fish are added to the fish drawer 14. The fish drawer is then inserted into the pedestal and the handle 102 rotated to its vertical position to clamp the fish drawer 14 and viewing tank 10 together. Water is then added to the reservoir through the fill hole 50 within pedestal 12 until it is filled. To operate, the aquarium is turned on causing the automatic heater, feeder and circulation system to be activated. Water is pumped into viewing tank 12 through nozzles 38 and 48. The water falls through opening 42 into fish drawer 14. When the water level rises sufficiently, water flows under pressure through the fish drawer bottom grating 100 into the upflow pipe 44, through the filters 18 and 20, and ultimately back into the reservoir 16 in base 54 to be recirculated. The water output of the pumps is greater than the capacity of the upflow pipe 44, creating a back pressure which causes water to rise in the viewing tank 12 until it is filled and water pressure seals valve 142 at its top.

Once activated, the aquarium will operate for extended periods of time, automatically feeding fish, filtering water, controlling temperature and switching lights. Each of these parameters may be separately controlled by suitable control means which form no part of this invention.

When it is necessary to replace or add fish or to clean the contents of the fish drawer 14, the aquarium is turned off. Pumps 22 and 23 stop, causing the water within the viewing tank 12 to drain through the fish drawer bottom grating 180 into the upflow pipe 44, through the filter 18 and 20 and back into the reservoir causing the fish to be harmlessly deposited into the fish drawer 14. When the viewing tank is empty it may be easily lifted out for cleaning. To service the contents of the fish drawer, panel 56 is removed and handle 102 pulled to release the drawer 14. The drawer can then be withdrawn from pedestal 10 to provide access to the drawer and its contents. Because of the air pocket 112, the water level in the fish drawer is maintained below the upper edge of the drawer thereby reducing the likelihood of spillage.

As is apparent from the foregoing description, various components of the invention must be sealed. Where watertight seals are required, rubber O-rings seated in grooves of a plate have proven satisfactory. For the sake of simplicity and clarity, all of the O-rings required for adequate sealing have not been illustrated.

As indicated above, it is contemplated that the aquarium will include appropriate heating means for controlling the temperature of the water and appropriate electrical connections and circuits for operating the various motors and fluorescent lights. It is contemplated that control of these various devices will be automatic once the aquarium has been turned "on". The lights 168 which are necessary for proper growth of the plants within the viewing tank 14 may be turned on and off in accordance with a predetermined and variable schedule. The lights 30 which illuminate the viewing tank 12 may be manually controlled. As mentioned above, the user may have the ability to selectively operate one or both water pumps 22 and 23. Once each day, the water recirculation system may be turned off for a short period of time (for example ten seconds) to depressurize the tank. This permits the water level in the viewing tank 12 to drop slightly to reseat the valve cup 144 so that air which may have collected in the viewing tank can be expelled.

Although in the preferred embodiment, a cylindrical viewing tank is used in conjunction with a pyramidal pedestal the principles of the invention are equally applicable to other shapes, sizes and configurations. Also, the way in which the elements are interconnected is not a critical feature of the invention and the invention contemplates any suitable construction for assembling the parts so that undesired leakage is avoided.

What is claimed is:

1. An aquarium, comprising:
a pedestal,
a viewing tank supported by said pedestal, and
a reservoir and movable secondary tank within said pedestal, said secondary tank being movable into and out of liquid communication with said viewing tank so that fish can swim between the viewing tank and secondary tank, when the two are in liquid communication.

2. An aquarium according to claim 1, further including means for circulating water between said secondary tank, said reservoir, and said viewing tank.

3. An aquarium according to claim 2, wherein said pedestal is bifurcated and includes at least two spaced apart upstanding arms, and wherein said viewing tank is cylindrical and is mounted between said spaced apart arms to prevent bowing of the walls of said viewing tank.

4. An aquarium according to claim 3, including means within said spaced apart arms for lighting said viewing tank.

5. An aquarium according to claim 1, wherein said viewing tank comprises two transparent outer walls and a transparent peripheral strip, each of the walls including a circumferential tab extending radially from the wall and the peripheral strip including two elongated grooves for retaining said circumferential tabs.

6. An aquarium, comprising:

a pedestal, a viewing tank having an opening mounted in said pedestal, a reservoir within said pedestal, the volume of said reservoir being sufficient to hold the entire contents of said viewing tank, a movable fish drawer within said pedestal, said fish drawer having an opening adapted to communicate with the opening in said viewing tank, means for securing said viewing tank and fish drawer together so that fish can move between said viewing tank and fish drawer through said openings.

water filtering means mounted within said pedestal, and means for recirculating the water in said aquarium through said water filtering means.

7. An aquarium according to claim 6, wherein said viewing tank is cylindrical and wherein said cylindrical viewing tank includes water inlet means positioned near the bottom of the viewing tank for directing water into said viewing tank in opposite peripheral directions.

8. An aquarium according to claim 7, wherein said pedestal includes two upstanding arms and said cylindrical viewing tank is mounted between said arms, and wherein lamps are mounted in at least one of said pedestal arms for illuminating the contents of said viewing tank.

9. An aquarium according to claim 8, wherein the surfaces of said pedestal arms contiguous to said viewing tank are reflective.

10. An aquarium according to claim 7, wherein said tank includes two water inlet means, and wherein said recirculating means includes means for selectively pumping water to one or both of said water inlet means.

11. An aquarium according to claim 7, including a vent in the uppermost portion of said viewing tank and valve means within said viewing tank for closing said vent when said viewing tank is substantially filled with water.

12. An aquarium according to claim 6, wherein said water filtering means is mounted above said fish drawer within said pedestal, said filtering means being below the uppermost point of said viewing tank, and wherein said recirculating means includes a conduit extending from the bottom of said fish drawer to an input to the filtering means.

13. An aquarium according to claim 6, wherein said fish drawer includes a downwardly depending baffle positioned at one side of said openings so as to permit an air pocket to be created in said fish drawer when the viewing tank is filled with water, and means for introducing air under pressure into said air pocket.

14. An aquarium according to claim 13, further comprising fish feeding means for automatically feeding the fish by dispensing fish food into said air pocket, said fish feeding means being mounted in a compartment within said pedestal.

15. An aquarium according to claim 14, wherein said fish feeding means includes a sealed feed box, a rotatable disk in said feed box, and a feed tube extending from said feed box into said fish drawer above said air pocket, said disk including apertures for moving fish pellets from said feed box to the upper end of said feed tube so that the fish food drops through said tube and falls on the surface of the water beneath the air pocket.

16. An aquarium according to claim 15, further including means for forcing air down said feed tube to create the air pocket.

17. An aquarium according to claim 6, wherein said pedestal includes a base, and said fish drawer includes side panels adapted to rest on said base, and wherein said securing means comprises a rotatable handle at one end of said fish drawer, said rotatable handle including at least one cam surface adapted to engage said pedestal base for forcing the fish drawer into a tightly sealed engagement with the bottom of said viewing tank.

18. An aquarium, comprising:

a pedestal, a viewing tank having a bottom opening mounted in said pedestal, a reservoir within said pedestal beneath said viewing tank, the volume of said reservoir being sufficient to hold the entire contents of said viewing tank, a movable fish drawer within said pedestal beneath said viewing tank, said fish drawer having an upper opening adapted to communicate with the bottom opening in said viewing tank and an up-flow tube extending from an inlet near the bottom of said fish drawer to an outlet opening at the top of the fish drawer, means for securing said viewing tank and fish drawer together so that fish can move between said viewing tank and fish drawer through said openings, pump means for pumping water from said reservoir into said viewing tank, water filtering means mounted within said pedestal beneath the upper surface of said viewing tank, and recirculating means including means for connecting the outlet opening of said up-flow tube to said water filtering means and means enabling water from said water filtering means to flow into said reservoir.

19. An aquarium according to claim 18, wherein said movable fish drawer includes a bottom grate for supporting sand and/or gravel in which aquarium plants can be planted, said grate having holes through which water can flow, said upflow tube being mounted in said fish drawer so that its inlet is beneath the grate.

20. An aquarium according to claim 19, wherein said pedestal includes an intermediate shelf above said reservoir, said water filtering means being mounted on said shelf, and wherein said enabling means comprises perforations in said shelf positioned to permit water to flow from said water filtering means through said perforations into said reservoir.

21. An aquarium according to claim 18, wherein said viewing tank is cylindrical and wherein said cylindrical viewing tank includes water inlet means positioned near the bottom of the viewing tank for directing water into said viewing tank in opposite peripheral directions.

22. An aquarium according to claim 18, wherein said pedestal includes two upstanding arms and said cylindrical viewing tank is mounted between said arms, and wherein lamps are mounted in at least one of said pedestal arms for illuminating the contents of said viewing tank.

23. An aquarium according to claim 22, wherein the surfaces of said pedestal arms contiguous to said viewing tank are reflective.

24. An aquarium according to claim 18, wherein said tank includes two water inlet means and wherein said recirculating means includes means for selectively pumping water to one or both of said water inlet means.

25. An aquarium according to claim 18, including a vent in the uppermost portion of said viewing tank and valve means within said viewing tank for closing said vent when said viewing tank is substantially filled with water.

26. An aquarium according to claim 18, wherein said fish drawer includes a downwardly depending baffle positioned at one side of said openings so as to permit an air pocket to be created in said fish drawer when the viewing tank is filled with water, and means for introducing air under pressure into said air pocket.

27. An aquarium according to claim 26, further comprising fish feeding means for automatically feeding the fish by dispensing fish food into said air pocket, said fish feeding means being mounted in a compartment within said pedestal.

28. An aquarium according to claim 27, wherein said fish feeding means includes a sealed feed box, a rotatable disk in said feed box, and a feed tube extending from said feed box into said fish drawer above said air pocket, said disk including apertures for moving fish pellets from said feed box to the upper end of said feed tube so that the fish food drops through said tube and falls on the surface of the water beneath the air pocket.

29. An aquarium according to claim 28, further including means for forcing air down said feed tube to create the air pocket.

30. An aquarium according to claim 18, wherein said pedestal includes a base, and said fish drawer includes side panels adapted to rest on said base, and wherein said securing means comprises a rotatable handle at one end of said fish drawer, said rotatable handle including at least one cam surface adapted to engage said pedestal base for forcing the fish drawer into a tightly sealed engagement with the bottom of said viewing tank.

* * * * *